Patented Nov. 3, 1931

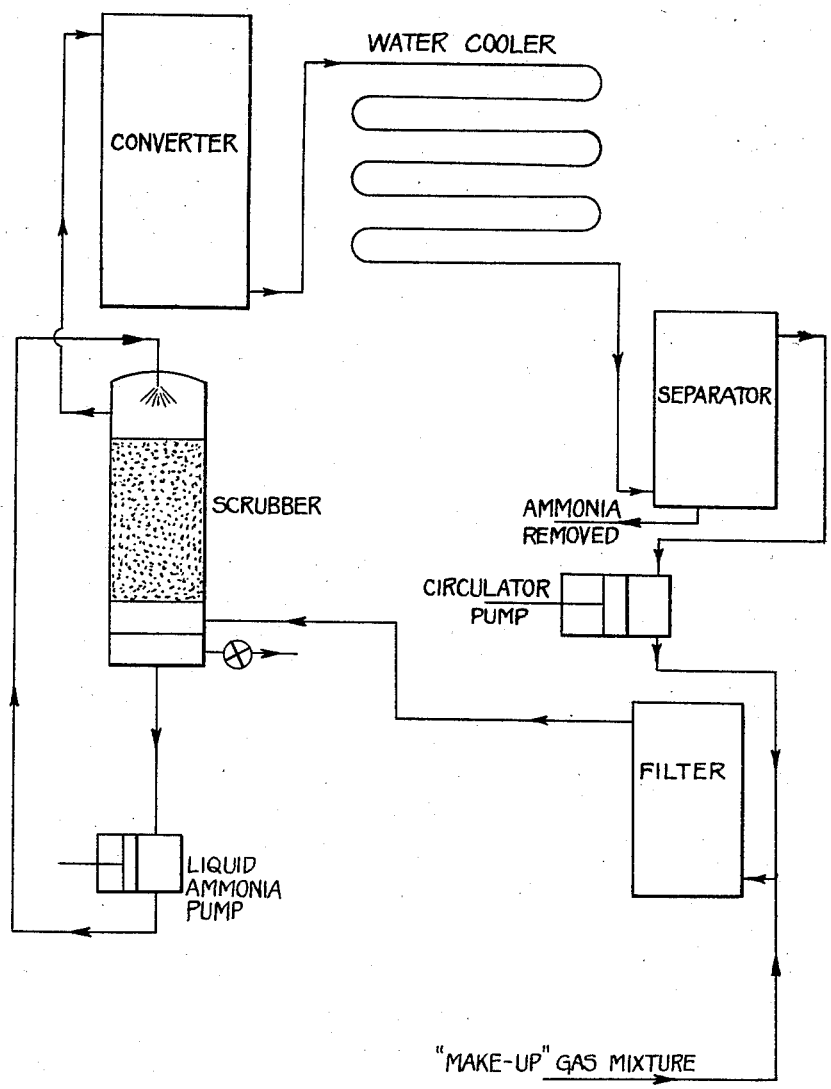

1,830,167

UNITED STATES PATENT OFFICE

LOUIS CLEVELAND JONES, OF GREENWICH, CONNECTICUT, ASSIGNOR TO CHEMICAL ENGINEERING CORPORATION, OF NEW YORK, N. Y., A CORPORATION OF DELAWARE

PRODUCTION OF AMMONIA

Application filed March 26, 1925. Serial No. 18,607.

My invention relates generally to the synthetic manufacture of ammonia from its elements and is particularly adapted to improved processes for purifying the gaseous mixture of hydrogen and nitrogen in the manufacture of anhydrous ammonia.

The commercial production of synthetic ammonia requires the mixture of nitrogen and hydrogen in the proportion of one to three by volume, compressed to 100 or more atmospheres and passed over a suitable catalytic agent capable of stimulating the combination of the two gases whereby sufficient heat is produced to maintain the temperatures required for satisfactory yields.

The presence of certain impurities in the gases used for this synthetic manufacture of ammonia causes deterioration of the catalyst or poisons it so that its activity is largely diminished and ultimately such catalyst ceases to act. It is essential that such poisoned catalyst should be replaced or rejuvenated and this necessitates interruption of the production. Such impurities ordinarily present in this gas mixture are usually oxygen (either free or in combination), and also chlorine, sulphur and phosphorus in various combinations.

In industrial practice, therefore, it is extremely advantageous in securing satisfactory yields to remove, if possible, even the last traces of these harmful impurities from the nitrogen-hydrogen mixture before treating same catalytically.

I have discovered that ammonia can be produced with satisfactory yields by washing the mixed nitrogen and hydrogen under pressure of 100 or more atmospheres in liquid ammonia or in ordinary commercial ammonia containing a fraction of one per cent of water, which method removes practically all of the deleterious impurities including aqueous vapors present in the gas mixture under compression. The aqueous ammonia preferably used in my process is aqua ammonia of very high ammonia content, i. e. 90 to 99% ammonia and 10 to 1% water. In carrying out my improved process, controlled amounts of pure or commercial ammonia in the liquid condition are introduced into the compressed mixture so as to absorb not only the carbon dioxide and moisture, oxides of sulphur and phosphorus, hydrochloric acid, chlorine and hydrogen sulphide usually present in this gaseous mixture, but also more particularly the hydrocarbons, oil vapors, carbon monoxide and such other impurities as are injurious to the catalyst. Such amounts of ammonia introduced may be varied in proportion to the amounts necessary to react with the impurities found present in the gas mixture to be purified. The liquid ammonia is preferably passed into and repeatedly circulated through the nitrogen hydrogen mixture under pressure counter to the movement of the gas by being distributed over a surface-giving mass in a continuous cycle of operations.

The following example in conjunction with the accompanying drawing showing a diagrammatic lay-out of suitable apparatus will serve to illustrate further the nature of my invention, which, however, is not confined to this particular example: Pass the mixture of nitrogen and hydrogen under pressure of about 100 atmospheres into the base of a scrubber containing short sections of iron pipe to produce a suitable surface-giving mass over which is poured said liquid ammonia which trickles downwardly over the mass counter to the flow of gas upwardly through the scrubber. Such liquid ammonia passes out of the bottom of the scrubber by a conduit leading to a suitable ammonia pump which again forces the ammonia to the top of the scrubber to redistribute the ammonia over the surface-giving mass as the gas mixture under pressure continues to pass through the scrubber, such circulation continuing for a period until the ammonia has taken up water approximately to ten (10) per cent of its weight, and is then removed from circulation along with the impurities. Such washing of the gas mixture with the pure or commercial liquid ammonia removes the last traces of the before-mentioned impurities from the gas mixture, particularly the moisture, oil vapors and other hydrocarbons, and the current of substantially pure gas mixture is then passed for further treatment over the catalytic agent.

I wish it to be understood that the foregoing example is only one practical method of carrying out my invention; the details may be widely varied in many ways without departing from the scope of the invention or sacrificing the advantages obtained from its use.

I claim as my invention:

1. In the production of ammonia from a gaseous mixture of nitrogen and hydrogen containing catalyst-poisoning compounds the steps which comprise washing said mixture under pressure with liquid ammonia free from alkalies and alkali earth metals, said ammonia having a water content not to exceed one per cent, and removing said ammonia when it has absorbed water approximately to ten per cent of its weight, whereby water and hydrocarbon compounds are removed from said mixture along with the ammonia.

2. In the production of ammonia from a gaseous mixture of nitrogen and hydrogen containing catalyst-poisoning compounds, the steps for purifying said mixture which comprise passing the mixture over a surface-giving mass wetted with liquid ammonia free from alkalies and alkali earth metals and having a water content not to exceed one per cent to remove water and hydrocarbon compounds, continuing the circulation until the said ammonia has taken up water approximately to ten per cent of its weight, and removing said ammonia and absorbed compounds from the circulation system.

3. In the production of ammonia from a gaseous mixture of nitrogen and hydrogen containing catalyst-poisoning compounds, the steps for purifying said mixture under pressure and before catalysis which comprises passing the mixture over a surface-giving mass wetted with liquid ammonia free from alkalies and alkali earth metals and having a water content not to exceed one per cent to remove water and hydrocarbon compounds injurious to the catalyst, and removing said ammonia when it has taken up water approximately to ten per cent of its weight.

4. In the production of ammonia from a gaseous mixture of nitrogen and hydrogen containing catalyst-poisoning compounds in continuous circulation, the step for purifying said mixture from said compounds which comprises washing said mixture under pressure with liquid ammonia containing a fraction of one per cent of water until its water content has increased to approximately ten per cent and then removing same from circulation.

LOUIS CLEVELAND JONES.